United States Patent
Ji et al.

(10) Patent No.: US 9,411,398 B2
(45) Date of Patent: Aug. 9, 2016

(54) ELECTRONIC DEVICE AND METHOD TO EXTEND BATTERY LIFE

(71) Applicant: INTEL CORPORATION, Santa Clara, CA (US)

(72) Inventors: Gang Ji, Santa Clara, CA (US); Alexander B. Uan-Zo-Li, Hillsboro, OR (US); Jorge P. Rodriguez, Portland, OR (US); Andy Keates, Los Gatos, CA (US); Vasudevan Srinivasan, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 577 days.

(21) Appl. No.: 13/630,846

(22) Filed: Sep. 28, 2012

(65) Prior Publication Data

US 2014/0095897 A1 Apr. 3, 2014

(51) Int. Cl.
  *G06F 1/32* (2006.01)
  *G06F 1/26* (2006.01)

(52) U.S. Cl.
  CPC .............. *G06F 1/3212* (2013.01); *G06F 1/324* (2013.01); *Y02B 60/1217* (2013.01); *Y02B 60/1292* (2013.01)

(58) Field of Classification Search
  CPC ... G06F 1/3212; G06F 1/3206; G06F 1/3234; G06F 1/324; G06F 1/32; G06F 1/26
  USPC ......................................................... 713/300
  See application file for complete search history.

(56) References Cited

U.S. PATENT DOCUMENTS

| | | | |
|---|---|---|---|
| 6,714,016 B2* | 3/2004 | Odaohhara et al. | 324/427 |
| 6,928,559 B1* | 8/2005 | Beard | 713/300 |
| 7,698,575 B2 | 4/2010 | Samson | |
| 7,779,280 B2* | 8/2010 | Shuster | 713/320 |
| 8,254,868 B2* | 8/2012 | Constien et al. | 455/343.1 |
| 2005/0114721 A1* | 5/2005 | Azadet et al. | 713/320 |
| 2008/0201587 A1* | 8/2008 | Lee | 713/320 |
| 2010/0085016 A1* | 4/2010 | Kim et al. | 320/136 |
| 2011/0138197 A1 | 6/2011 | Lakshmanan et al. | |
| 2012/0021807 A1* | 1/2012 | Book et al. | 455/572 |
| 2012/0030454 A1* | 2/2012 | Book et al. | 713/2 |
| 2012/0197341 A1 | 8/2012 | Cowley et al. | |

FOREIGN PATENT DOCUMENTS

WO WO 2013/147874    10/2013
WO    2014/052119 A1    4/2014

OTHER PUBLICATIONS

International Search Report and Written Opinion dated Dec. 27, 2013 for corresponding Application No. PCT/US2013/060394.

* cited by examiner

*Primary Examiner* — Jaweed A Abbaszadeh
*Assistant Examiner* — Terrell Johnson
(74) *Attorney, Agent, or Firm* — KED & Associates, LLP

(57) ABSTRACT

An electronic apparatus is provided that includes a processor, a voltage regulator, a battery controller and an embedded controller. The voltage regulator to receive an input voltage and to provide an output voltage to the processor. The battery controller to store electronic device information and to receive battery information related to a current battery power. The embedded controller to receive the electronic device information and the battery information from the battery controller, and the embedded controller to provide power information to the processor based on the received information.

24 Claims, 6 Drawing Sheets

ELECTRONIC DEVICE AND METHOD TO EXTEND BATTERY LIFE

BACKGROUND

1. Field

An embodiment may relate to utilizing battery information to operate components of an electronic device.

2. Background

Power management techniques have been developed to enable users of mobile computing devices to operate using battery power for an extended period of time. However, techniques may be applied without much knowledge about a status of the battery power.

BRIEF DESCRIPTION OF THE DRAWINGS

Arrangements and embodiments may become apparent to one skilled in the art by reading the following specification and appended claims, and by referencing the following drawings in which like reference numerals refer to like elements and wherein:

DETAILED DESCRIPTION

Embodiments may relate to a system that may include a processor, a controller (or an embedded controller), a voltage regulator (VR) and a battery system. The system may be an electronic device, for example.

The battery system may be configured to determine current battery status information as well as to store system information (or electronic device information). The system information may be provided from a manufacturer, or the system information may be input by a user.

The battery system may provide the current battery status information and the stored system information to the embedded controller, for example. The embedded controller may determine at least one power parameter of the processor (or other component(s) of a platform of the electronic device). An operation of the processor (or other component of the platform) may change based on the received information. For example, a maximum current or a maximum power of the processor may change so as to conserve battery life.

Figure 1:
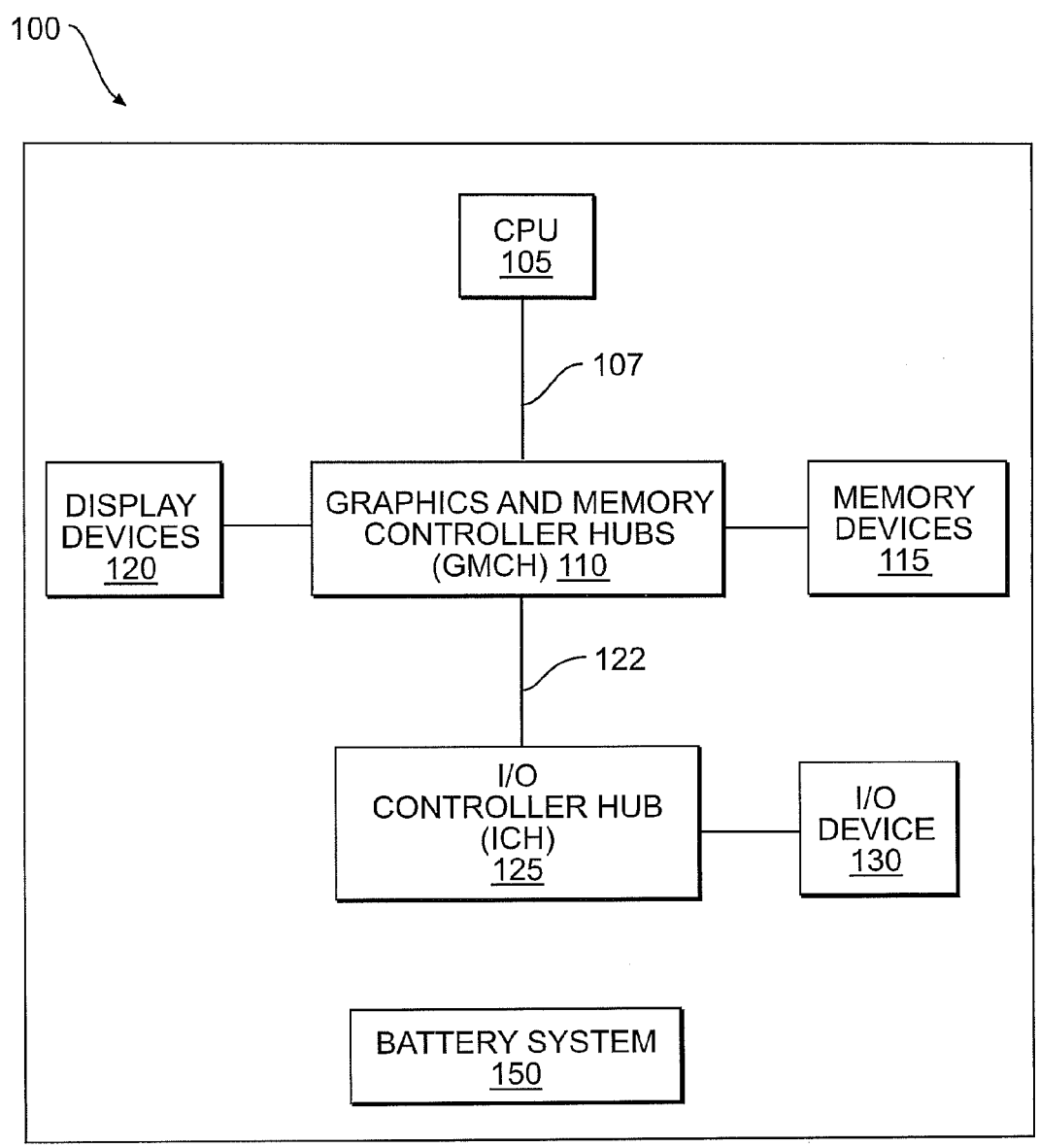
FIG. 1 is a block diagram of a computer system (or electronic device) according to an example arrangement.

FIG. 1 is a block diagram of a computer system (or electronic device) according to an example arrangement. Other arrangements may also be provided.

FIG. 1 shows that a computer system 100 may include a central processing unit (CPU) 105 (or processor), a graphics and memory controller hub (GMCH) 110, and an input/output controller hub (ICH) 125. The GMCH 110 may be coupled to the CPU 105 via a bus 107. The ICH 125 may be coupled to the GMCH 110 via a bus 122. The GMCH 110 may also be coupled to memory devices 115 and display devices 120. The ICH 125 may be coupled to I/O devices 130. The GMCH 110 may include a graphics system. Although the CPU 105, the GMCH 110 and the ICH 125 may be shown as separate components, functions of two or more of these components may be combined. A power supply may be used to provide power to the computer system 100. The power supply may be a battery (hereinafter also referred to as a battery system 150) or an external power source. The computer system 100 may include many other components; however, for simplicity, they are not shown in FIG. 1.

Figure 2:
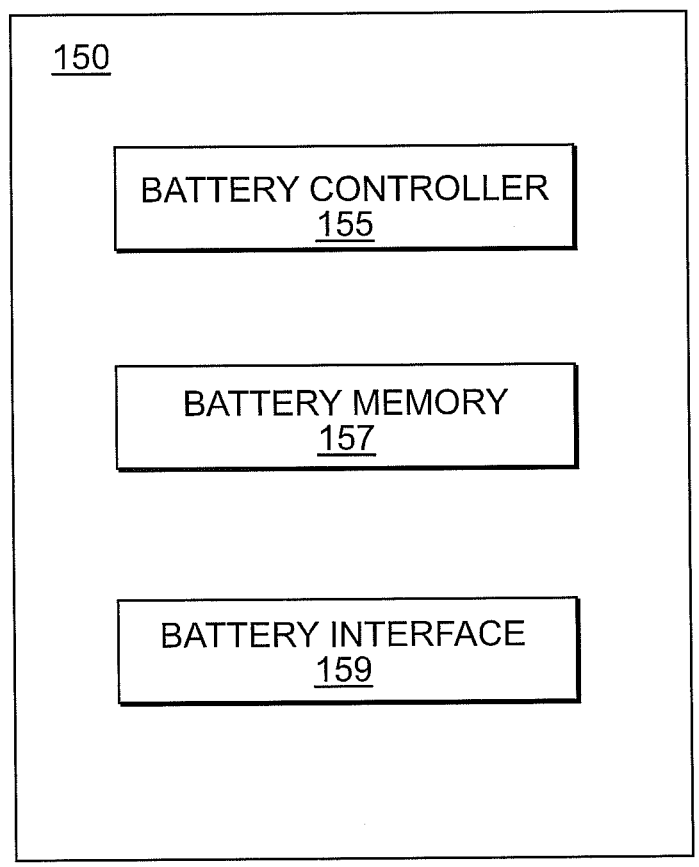
FIG. 2 is a block diagram of a battery system according to an example arrangement.

FIG. 2 is a block diagram of a battery system 150 according to an example arrangement. Other arrangements may also be provided.

The battery system 150 may be a smart battery system and may include a battery controller 155, a battery memory 157 and a battery interface 159. The battery controller 155 may be configured to perform operations that enable the battery system 150 to protect the battery life. For example, this may include operation(s) that prevent overcharging and/or operation(s) that control discharging.

The battery system 150 may also include at least one battery. In at least one embodiment, the battery system 150 may include a first battery (or first battery cell) and a second battery (or second battery cell) coupled in series to provide a battery voltage $V_{batt}$. As used hereafter, battery life may refer to a total amount of voltage or energy provided in the batteries of the battery system.

The battery memory 157 may be configured to store instructions and/or information that may be used by the battery controller 155 (or other component). The instructions and/or information may be provided by a battery manufacturer, for example. The instructions and/or information may be subsequently modifiable. For example, the instructions and/or information may be stored in a firmware (such as, for example, a read-only memory or a flash memory) and may be replaced. The battery memory 157 may store information related to other components of the system (or the electronic device).

The battery system 150 may be designed according to the Smart Battery System Specification (e.g., Revision 1.0, Benchmarq Microelectronics Inc. et al, 1996). The battery system 150 may also be associated with a battery charger.

Battery status logic may also be included to receive battery parameters in order to determine current battery status information, resistance battery status information and/or battery power status information. The battery parameters may include one or more voltage parameters, one or more current parameters, one or more resistance parameters and/or battery power parameters, for example. The battery status logic may be implemented in software, hardware and/or a combination of software and hardware.

Figure 3:
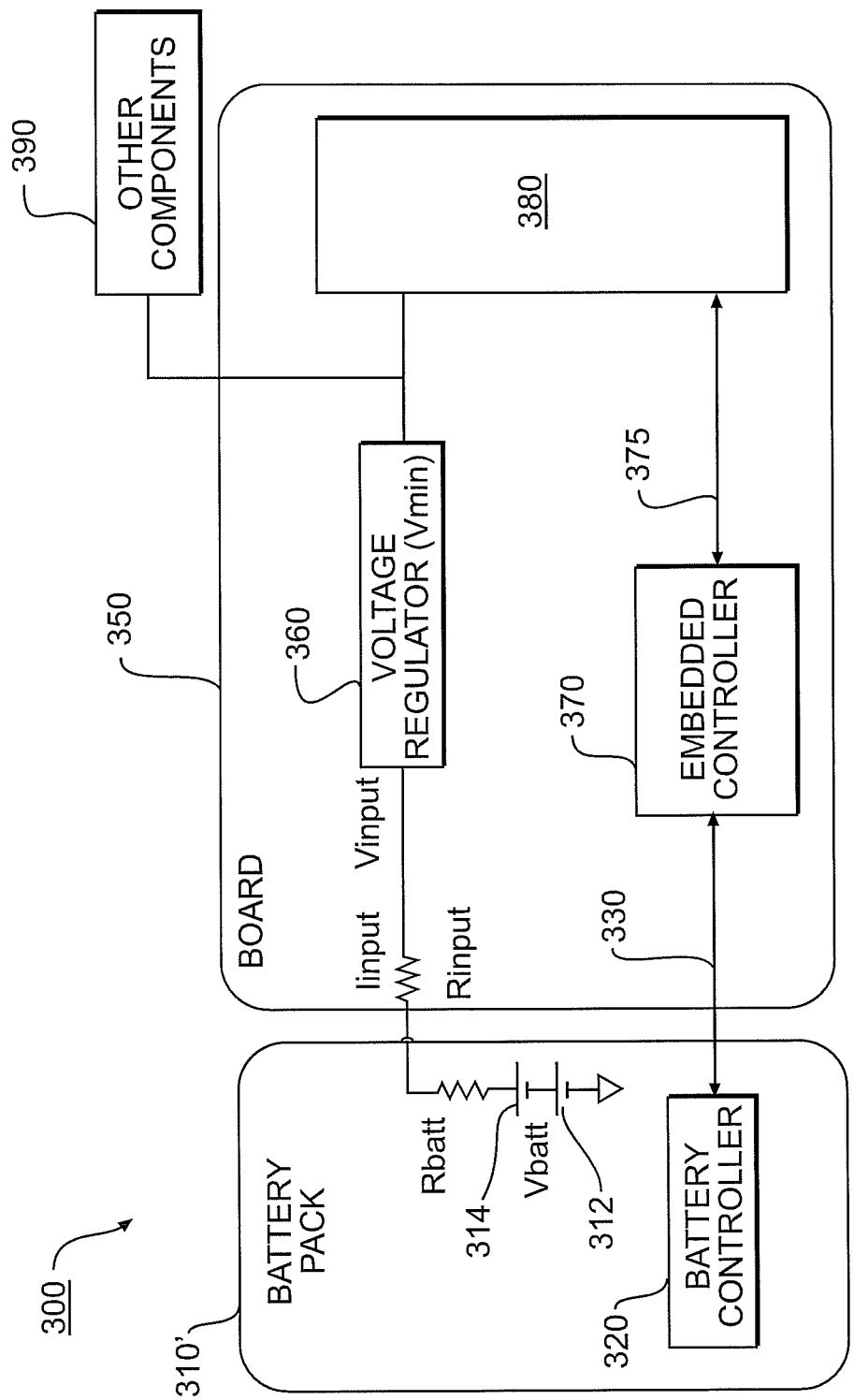
FIG. 3 shows an electronic device according to an example embodiment.

FIG. 3 shows an electronic device according to an example embodiment. Other embodiments and configurations may also be provided.

The electronic device may be any one of a number of battery-powered devices, such as, but not limited to, a mobile phone, a smartphone, a personal digital assistant, a media player, a laptop computer, a notebook computer, a computer system and/or a tablet, for example. Other types of electronic devices may also be provided.

An electronic device 300 shown in FIG. 3 may include components from FIGS. 1-2.

FIG. 3 shows that the electronic device 300 includes a battery pack 310 and a system board 350 (or platform). The system board 350 may also be considered an electronic system and/or an electronic device. The battery pack 310 may include components of the battery system 150 shown in FIG. 2. The battery pack 310 may be provided within the electronic device 300 (or the system).

The battery pack 310 may include battery cells 312, 314 and a battery controller 320. The battery cells 312 and 314 may be provided in series to provide a battery voltage $V_{batt}$. The battery cell 312 may correspond to a first battery, and the battery cell 314 may correspond to a second battery coupled in series with the first battery. Other numbers of battery cells may also be provided.

The battery voltage $V_{batt}$ may be used to power the electronic device 300. The battery voltage $V_{batt}$ may change over time based on use of the first and second batteries and/or based on temperature.

The battery controller 320 may also be called a fuel gauge or gas gauge. The battery controller 320 may correspond to the battery controller 155 discussed above with respect to FIG. 2. The battery controller 320 may include a controller (or microcontroller) that is programmed with information regarding the battery pack 310 and/or the electronic device (or the system). The battery controller 320 may store electronic device information and battery information related to a current battery power (i.e., power status information). The current battery power may be updated on a regular basis. The electronic device information may be previously provided into the battery controller 320. For example, the electronic device information may be provided by a manufacturer.

The battery controller 320 may monitor charge (or energy) in the battery cells. The battery controller 320 may therefore monitor impedance of the battery cells in real time.

The battery pack 310 may include resistance $R_{batt}$ which represents battery cell resistance and parasitic resistance within the battery pack 310, such as cell interconnect, sense resistor, transistor, fuse, connector of battery pack, etc.

The system board 350 may receive power from the battery cells 312, 314 of the battery pack 310. Components of the system board 350 may be powered by the received power. The system board 350 may also include resistance $R_{input}$ which is a parasitic resistance on an input path of the voltage regulator 360 (from the battery pack 310).

The system board 350 may include a voltage regulator (VR) 360, an embedded controller 370 (or controller) and a processor 380 (such as a central processing unit (CPU)). The voltage regulator 360 may receive power from an input voltage $V_{input}$ and an input current $I_{input}$ of the battery pack 310. The voltage regulator 360 may provide an output voltage to the processor 380 or other components 390 provided that the input voltage $V_{input}$ is greater than a minimum input voltage $V_{min}$. As one example of an electronic device having two battery cells coupled in series, the voltage regulator 360 may receive an input voltage of 5.2 volts and may provide an output voltage of 5.0 volts to the processor 380 or other components 390.

In one example arrangement, the voltage regulator 360 may shut down when the input voltage $V_{input}$ falls below the minimum input voltage $V_{min}$, and the entire platform (or system) may shut down. In another example, the voltage regulator 360 may remain powered on when the input voltage $V_{input}$ falls below the minimum input voltage $V_{min}$, and the output voltage of the voltage regulator 360 may be out of a specified range, which may result in a system (or platform) shut down, loss of data and/or partial system shutdown.

The output voltage of the voltage regulator 360 may be used to power the processor 380. The output voltage of the voltage regulator 360 may also (or alternately) be used to power other components 390 of a platform (or system) of the electronic device 300.

The voltage regulator 360 is constrained by an electrical parameter, namely a minimum input voltage $V_{min}$. The minimum input voltage $V_{min}$ may also be called a specified minimum voltage regulator input voltage.

When the input voltage $V_{input}$ of the voltage regulator 360 decreases to a minimum input voltage $V_{min}$, then the voltage regulator 360 may automatically shut down (such as to a sleep mode or idle mode or power-off). When the voltage regulator 360 is shut down, then the voltage regulator 360 may not provide an output voltage to components of a platform of the electronic device 300. This may turn off the processor 380 and/or provide the processor 380 in a sleep mode or idle mode.

If the input voltage $V_{input}$ is greater than the minimum input voltage $V_{min}$, then the voltage regulator 360 may supply power to the other components 390 of a platform of the electronic device 300 in an active mode (and possibly a turbo mode). However, if the input voltage $V_{input}$ is less than the minimum input voltage $V_{min}$, then the voltage regulator 360 may not supply power to the other components 390 of a platform of the electronic device 300.

Due to certain operations and/or the power management technique, the electronic device 300 may allow the processor 380 (and/or other components 390) to awaken from the sleep mode and perform certain functions. For example, the processor 360 may be awaken and provided into a turbo mode to perform a desired operation. In the turbo mode, the voltage regulator 360 may be turned on to provide voltage to the processor 380. The turbo mode may utilize a high current. At the end of the turbo mode (such as at the end of the operation), the voltage regulator 360 may be shut down and/or the processor 380 may then be returned to a sleep mode or idle mode.

It may be undesirable to repeatedly awaken the processor 380 from the sleep mode to the turbo mode, and then return the processor 380 from the turbo mode to the sleep mode. This may decrease the overall battery life. Embodiments may dynamically adjust power parameters of a load (such as a processor) so as to extend battery life of the battery system.

Embodiments may adjust power of a load so that the voltage regulator 360 does not get shut down as often. Embodiments may adjust a maximum power of the processor 380 (or other component) to maintain the input voltage $V_{input}$ of the voltage regulator 360 above the minimum input voltage $V_{min}$ of the voltage regulator 360. In at least one embodiment, the processor 380 may receive power information and adjust a current $I_{cc}$ of the processor 380 so as to maintain the input power $V_{input}$ above the minimum input power $V_{min}$. The current $I_{cc}$ may also be called a maximum allowable processor input current.

Embodiments may dynamically adjust the current $I_{cc}$ (i.e., the maximum allowable processor input current). The processor 380 may limit its maximum frequency $F_{max}$ in a turbo mode based on the information (or power status information) received from the battery controller 320 and/or the embedded controller 330. If the battery pack 310 can support a maximum turbo power level, then the embedded controller 370 may allow the processor 380 to operate (or run) at a maximum current $I_{cc}$ level (or $I_{max}$). If the battery controller 320 reports a lower power level, then the embedded controller 370 may lower the operating current $I_{cc}$ level of the processor 380.

Embodiments may utilize the embedded controller 370 (or another component on the system board 350) to communicate with the battery controller 320, and/or to communicate with the processor 380.

The embedded controller 370 may also be called a battery control agent or a system agent. The embedded controller 370 may be coupled to the battery controller 320 via a bus 330. The bus 330 may provide bi-directional communication between the embedded controller 370 (or the system board 350) and the battery controller 320 (on the battery pack 310).

The embedded controller 370 may also be coupled to the processor 380 via a bus 375. The bus 375 may provide bi-directional communication between the embedded controller 370 and the processor 380. The embedded controller 370 may provide power information (such as at least one power parameter) to the processor 380 and/or other components 390 of a platform of the electronic device 300.

The power information (or parameters) provided from the embedded controller 370 may include any one of a calculated maximum current of the processor 380, a calculated maximum frequency of the processor 380 and/or a calculated maximum power of the processor 380. The power information (or parameters) may be determined by the embedded controller 370, for example. In another example, the power information may be determined by another component of the electronic device 300.

The power information may be provided to the processor 380 so that the processor 380 may adjust at least one operating parameter based on the received power information. For example, the processor 380 may adjust its maximum current based on the calculated maximum current of the processor 380. The processor 380 may adjust its operating frequency based on the calculated maximum frequency of the processor 380. The processor 380 may adjust its power load based on the calculated maximum power of the processor 380.

In at least one embodiment, the board 350 may include logic to provide power information to the processor 380 based on electronic device information and battery information related to a current battery power. The logic may include instructions to operate the processor based on received information.

In at least one embodiment, a machine readable medium may store instructions executable by logic to receive electronic device information, receive battery information related to a current battery power, and provide, to one or more processors, power information based on the received electronic device information and the received battery information.

Figure 4:
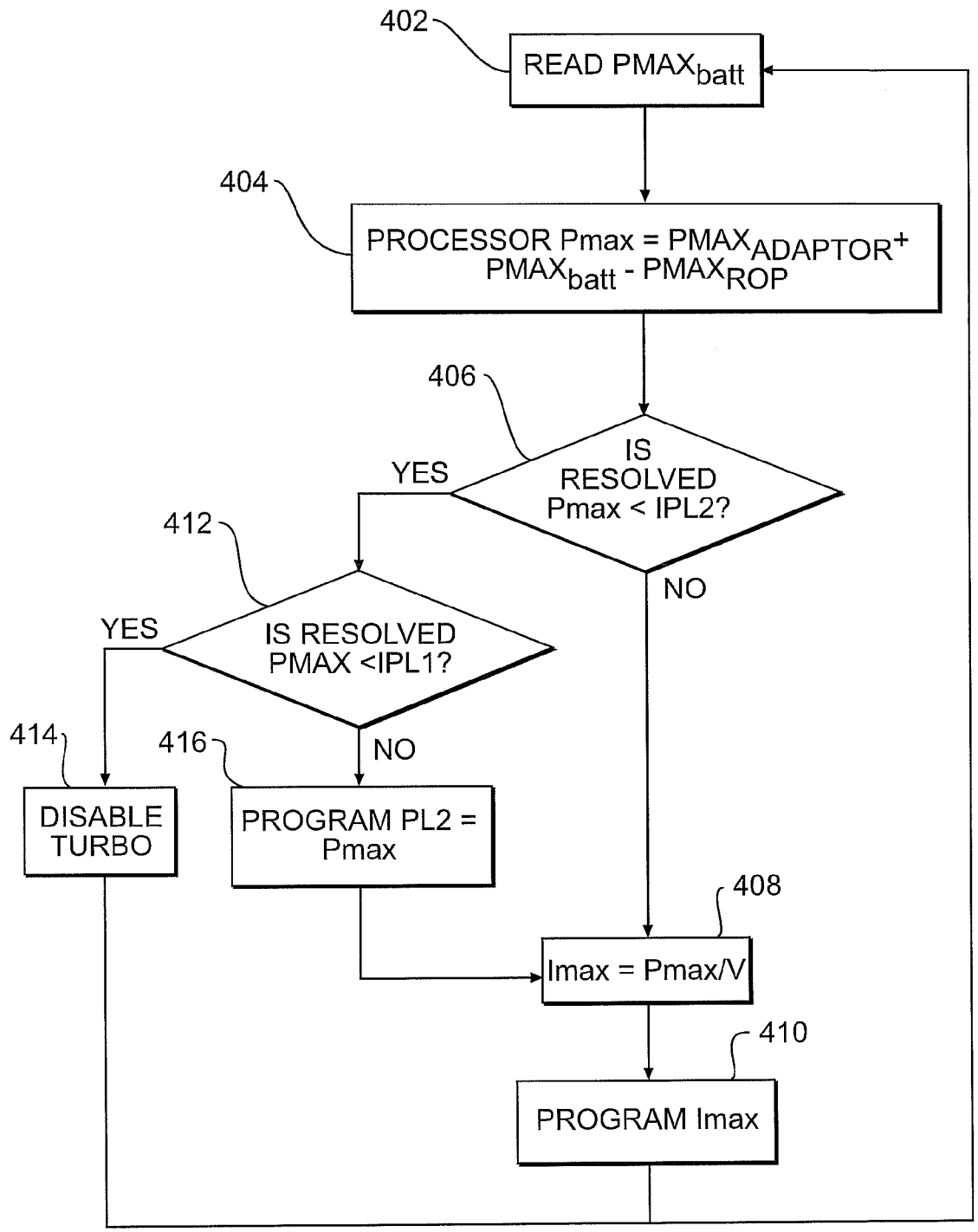
FIG. 4 is a flow chart of operations of an electronic device according to an example embodiment.

FIG. 4 is a flowchart of an electronic device according to an example embodiment. Other embodiments and operations may also be provided.

In operation 402, a maximum battery power $PMAX_{batt}$ may be determined from the battery pack 310. The maximum battery power $PMAX_{batt}$ may be a maximum power that a battery pack may provide to a device (or system). In operation 404, a maximum power of the processor $P_{max}$ may be determined from an AC adaptor power rating $PMAX_{adaptor}$, the maximum battery power $PMAX_{batt}$ and a worst case rest of platform power $PMAX_{ROP}$.

In operation 406, a determination may be made whether the resolved maximum processor power $P_{MAX}$ is less than a specific value iPL2. If it is determined that the resolved maximum process power $P_{MAX}$ is not less than the specific value iPL2, then a maximum current $I_{MAX}$ of the processor may be determined by dividing the maximum processor power $P_{MAX}$ by a voltage V (i.e., input voltage of processor). The calculated maximum current $I_{MAX}$ may then be programmed into the processor 380 in operation 410.

If the determination in operation 406 is that the resolved maximum processor power $P_{MAX}$ is less than the specific value iPL2, then a determination may be made in operation 412 whether the resolved maximum processor power $P_{MAX}$ is less than another specific value iPL1.

If the determination is that the resolved maximum processor power $P_{MAX}$ is not less than the specific value iPL1, then the specific value iPL2 may be programmed in operation 416. Operations may continue with operations 408 and 410.

On the other hand, if the determination is that the resolved maximum processor power $P_{MAX}$ is less than the specific value iPL1, then the turbo mode may be disabled in operation 414.

After operation 414 or operation 410, operations may return to operation 402 to determine the maximum battery power $PMAX_{batt}$. This loop may occur every "x" seconds, for example.

Figure 5:
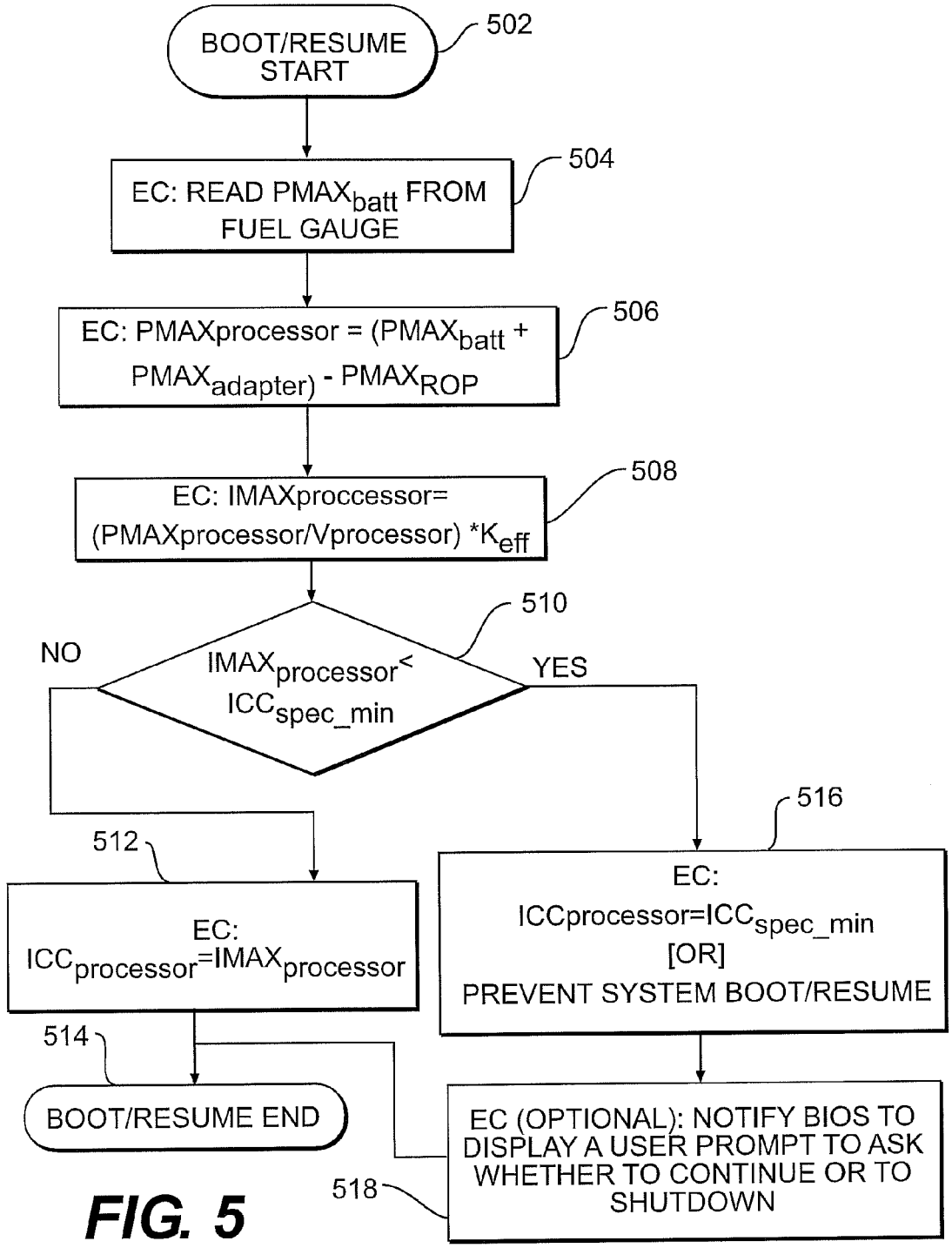
FIG. 5 is a flow chart of operations of an electronic device according to an example embodiment.

FIG. 5 is a flowchart of operations of an electronic device according to an example embodiment. Other embodiments and operations may also be provided.

More specifically, FIG. 5 relates to a dynamic battery power technology boot/resume time $ICC_{processor}$ initialization. In operation 502, a boot/resume may start. In operation, the embedded controller (EC) 370 may read or receive the maximum battery power $PMAX_{batt}$ from the battery controller 320.

In operation 506, the embedded controller 370 may determine the maximum processor power $PMAX_{processor}$ based on the maximum battery power $PMAX_{batt}$, the AC adaptor power rating $PMAX_{adaptor}$ and a worst case rest of platform power $PMAX_{ROP}$.

In operation 508, the embedded controller 370 may determine a maximum allowed ICC for the processor $IMAX_{processor}$ based on the maximum processor power $PMAX_{processor}$, the processor input voltage $V_{processor}$ and a voltage regulator efficiency factor $K_{eff}$. The voltage regulator efficiency factor $K_{eff}$ may be from a table of values for various $PMAX_{processor}$ values.

In operation 510, a determination may be made regarding whether $IMAX_{processor}$ is less than a minimum configurable ICC value for the processor $ICC_{spec\_min}$ (based on the specification).

If the determination is NO in operation 510, then the embedded controller 370 may associate $ICC_{processor}$ as being equal to $IMAX_{processor}$. The boot/resume may end in operation 514.

If the determination is YES in operation 510, then the embedded controller 370 may associate $ICC_{processor}$ as being equal to $ICC_{spec\_min}$. Alternatively, the operation 516 may prevent the system boot/resume, and the boot/resume may end in operation 514.

In at least one embodiment, the embedded controller 370 may notify BIOS to display a user prompt to ask whether to continue or to shutdown in operation 518.

Figure 6:
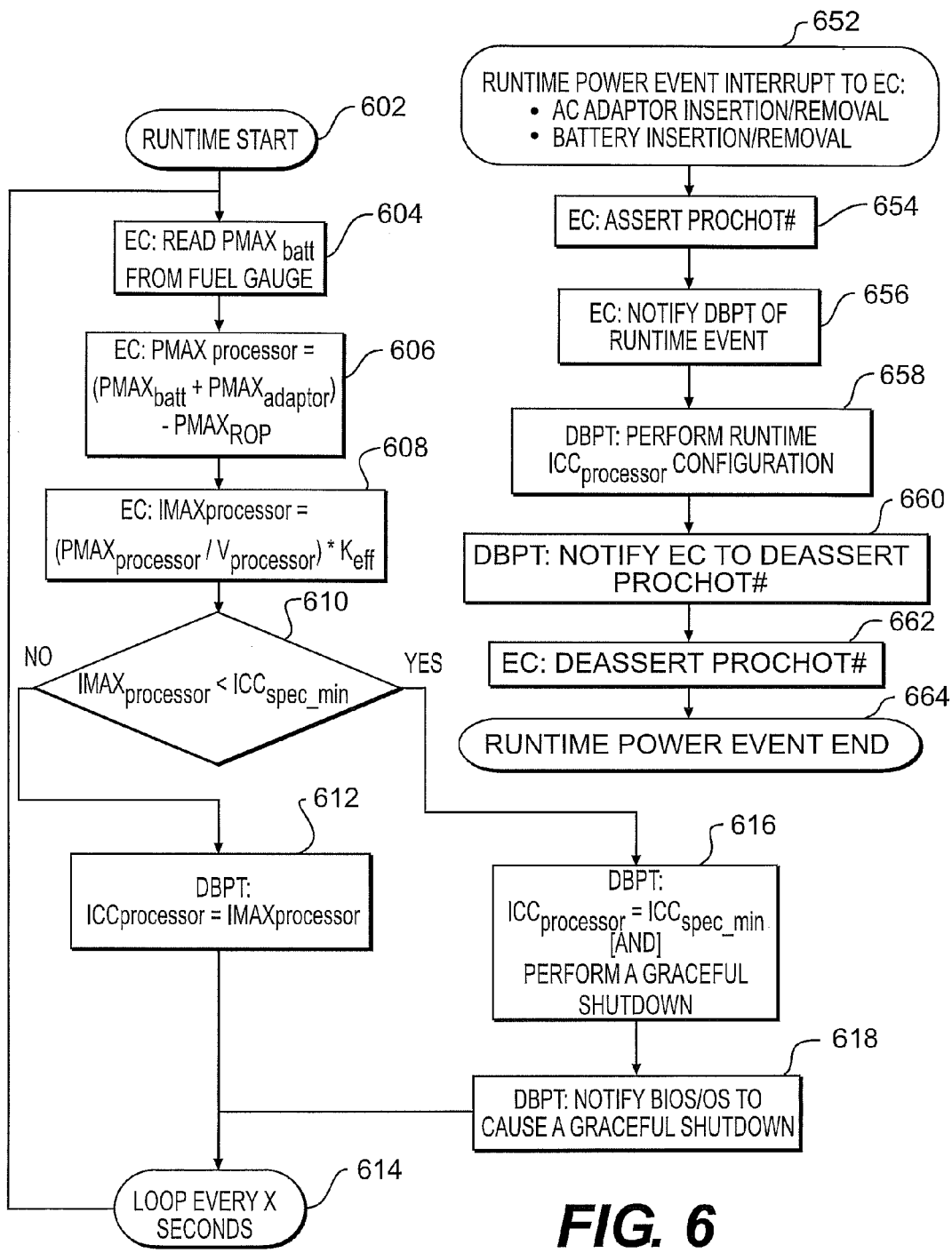
FIG. 6 is a flow chart of operations of an electronic device according to an example embodiment.

FIG. 6 is a flowchart of operations of an electronic device according to an example embodiment. Other embodiments and operations may also be provided.

In operation 602, a boot/resume may start. In operation 604, the embedded controller (EC) 370 may read or receive the maximum battery power $PMAX_{batt}$ from the battery controller 320.

In operation 606, the embedded controller 370 may determine the maximum processor power $PMAX_{processor}$ based on the maximum battery power $PMAX_{batt}$, AC adaptor power rating $PMAX_{adaptor}$ and $PMAX_{ROP}$.

In operation 608, the embedded controller 370 may determine $IMAX_{processor}$ based on the maximum processor power $PMAX_{processor}$, the processor input voltage $V_{processor}$ and the voltage regulator efficiency factor $K_{eff}$.

In operation 610, a determination may be made regarding whether $IMAX_{processor}$ is less $ICC_{spec\_min}$.

If the determination is NO in operation 610, then dynamic battery power technology may associate ICC$_{processor}$ as being equal to IMAX$_{processor}$. Operations may then loop every x seconds in operation 614.

If the determination is YES in operation 610, then the dynamic battery power technology may associate ICC$_{processor}$ as being equal to ICC$_{spec\_min}$. The operation 616 may also perform a graceful shutdown. In operation 618, the dynamic battery power technology may notify BIOS/OS to cause a graceful shutdown in operation 618. In operation 614, operations my loop back to operation 604 every x seconds.

Additionally, in operation 652, a runtime power event interrupt may occur to the embedded controller. In operation 654, the embedded controller may assert PROCHOT#. In operation 656, the embedded controller may notify the dynamic battery power technology of the runtime event.

In operation 658, the dynamic battery power technology may perform runtime ICC$_{processor}$ configuration. In operation 660, the dynamic battery power technology may notify the embedded controller to deassert PROCHOT#.

In operation 662, the embedded controller may deassert PROCHOT#. The runtime power event may end in operation 664.

Embodiments may adjust at least one operating parameter of the processor 380 based on power information received from the embedded controller 370. This may adjust the power usage of the processor 380 so as to conserve battery life. The adjustment of the power usage of the processor 380 may help delay the input voltage V$_{input}$ of the voltage regulator 360 decreasing to below the minimum input voltage V$_{min}$ of the voltage regulator 360. This may help delay the electronic device 300 entering a sleep mode (or idle mode or power-off) and preserve the battery life.

Embodiments may adjust power usage of the processor 380 (or the other component 390) based on parameters of the battery pack 310 and/or other parameters of the electronic device 300. For example, the input voltage V$_{input}$ of the voltage regulator 360 may be determined by the following equation:

$$V_{input} = V_{batt} - I_{input} \cdot (R_{batt} + R_{input}).$$

In this equation, V$_{input}$ represents the input voltage to the voltage regulator 360, V$_{batt}$ represents a total voltage of the first and second battery cells 312, 314, I$_{input}$ represents input current to the voltage regulator 360, R$_{input}$ represents parasitic resistance on the input path to the voltage regulator 360, and R$_{batt}$ represents resistance and parasitic resistance of the battery pack 310. Of these parameters, the resistance R$_{batt}$ may vary over time due to usage of the battery cells 312, 314. As one example, as the voltage within the battery cells 312, 314 decreases, then impedance of the battery cells 312, 314 increases, and the resistance R$_{batt}$ changes.

When the battery cells 312, 314 are discharging energy, the battery voltage V$_{batt}$ may gradually decrease, and the resistance R$_{batt}$ may increase since energy in the battery cells 312, 314 is decreasing. The change in resistance R$_{batt}$ may alter the input voltage V$_{input}$ of the voltage regulator 360 which is used to provide power to the processor 380 (or the other component 390). Embodiments may monitor the voltage in the battery cells 312, 314 and control the input voltage V$_{input}$ of the voltage regulator 360 by modulating V$_{input}$ through charging the current I$_{cc}$ of the processor 380 and/or the other components 390 so that the electronic system (and/or the board 350) may operate more efficiently and battery life may be maintained.

In at least one embodiment, the battery controller 320 may monitor at least one battery parameter, store other electronic device information and communicate the monitored and stored information to the embedded controller 370 via the bus 330. The battery controller 320 may determine the resistance R$_{batt}$ on a regular basis. The other parameters, such as R$_{input,}$ V$_{min}$ and/or I$_{max-pack}$ may be previously stored. I$_{max-pack}$ may represent a maximum output current of batteries based on their specification. The battery controller 320 may calculate how much power that the battery cells 312, 314 can provide.

The embedded controller 370 may perform calculations or determinations based on the received information, and communicate power information to the processor 380 via the bus 375. The power information may be information regarding an adequate I$_{cc}$ current for the processor 380, information regarding a maximum power of the processor 380 and/or information regarding a maximum frequency of the processor 380. The power information may be calculated to adjust a parameter of the processor 380 (or other load) to maintain the input voltage V$_{input}$ of the voltage regulator 360 above the minimum input voltage V$_{min}$ of the voltage regulator 360.

In at least one embodiment, the battery controller 320 may determine the maximum battery power PMAX$_{batt}$ that the battery cells 312, 314 can provide. The maximum battery power PMAX$_{batt}$ may be updated every ⅓ to 1 second, for example. The information regarding the maximum battery power PMAX$_{batt}$ may be provided to the embedded controller 370.

In at least one embodiment, the embedded controller 370 may provide a maximum current I$_{max}$ to the processor 380 based on the received maximum battery power PMAX$_{batt}$. Accordingly, the maximum current I$_{max}$ may be modulated based on platform and battery information.

Embodiments may reduce the input current I$_{input}$ to the voltage regulator 360 based on feedback from the embedded controller 370. This may slow down a reducing rate of the input voltage V$_{input}$ to the voltage regulator 360 and thereby extend a time duration for the input voltage V$_{input}$ of the voltage regulator 360 to reach the minimum input voltage V$_{min}$ of the voltage regulator 360. This may increase the battery life of the battery system. Accordingly, the processor 380 may operate in a turbo mode by battery power with a minimal impact on the battery life.

Various embodiments may be implemented using hardware elements, software elements, and/or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a processor;
   a voltage regulator to receive an input voltage and to provide an output voltage to the processor; and
   logic to provide first power information, at a first time, to the processor based on electronic device information and battery information related to a current battery power at the first time, the logic to provide second power information, at a second time, to the processor based on electronic device information and battery information related to a current battery power at the second time,
   the logic to calculate a first maximum calculated current of the processor and
   to calculate a second maximum calculated current of the processor,
   the first power information provided from the logic to include the first maximum calculated current of the processor, the second power information provided from the logic to include the second maximum calculated current of the processor,
   the second maximum calculated current of the processor being different from the first maximum calculated current of the processor, the processor to receive the first power information including the first maximum calculated current and the processor to operate based on the first power information including the first current of the processor,
   and the processor to receive the second power information including the second maximum calculated current and the processor to operate based on the second power information including the second maximum calculated current of the processor.

2. The electronic device of claim 1, wherein the logic is to receive the electronic device information and the battery information from a battery controller.

3. The electronic device of claim 1, further comprising at least one battery to provide the input voltage to the voltage regulator, and the logic to receive the battery information related to the current battery power based at least in part on the at least one battery.

4. The electronic device of claim 3, wherein the logic to receive battery power information regarding the at least one battery.

5. The electronic device of claim 1, wherein the power information provided from the logic includes a calculated maximum frequency for the processor.

6. The electronic device of claim 1, wherein the power information provided from the logic includes a calculated maximum power level for the processor.

7. The electronic device of claim 1, wherein the electronic device information relates to at least one of a voltage of the voltage regulator, a parasitic resistance and a current for the processor.

8. The electronic device of claim 7, wherein at least one of the electronic device information is provided from a manufacturer.

9. A non-transitory machine readable medium to store instructions executable by logic to:
   receive electronic device information;
   receive first battery information related to a current battery power at a first time;
   calculate a first maximum calculated current of one or more processors;
   provide, to the one or more processors, first power information, based on the received electronic device information and the received first battery information, the first power information to include the first maximum calculated current of the one or more processors;
   receive second battery information related to a current battery power at a second time different than the first time;
   calculate a second maximum calculated current of the one or more processors; and
   provide, to the one or more processors, second power information based on the received electronic device information and the received second battery information, the second power information to include the second maximum calculated current of the one or more processors.

10. The non-transitory machine readable medium of claim 9, wherein the electronic device information is received from a battery controller.

11. The non-transitory machine readable medium of claim 9, wherein the battery information is received from a battery controller.

12. The non-transitory machine readable medium of claim 9, wherein the logic comprises instructions to operate the processor based on the received power information.

13. The non-transitory machine readable medium of claim 9, wherein the logic to receive battery power information regarding at least one battery.

14. The non-transitory machine readable medium of claim 9, wherein the power information includes a maximum calculated frequency for the processor.

15. The non-transitory machine readable medium of claim 9, wherein the power information includes a maximum calculated power level for the processor.

16. The non-transitory machine readable medium of claim 9, wherein the electronic device information relates to at least one of a voltage of a voltage regulator, a parasitic resistance and a current for the processor.

17. The non-transitory machine readable medium of claim 9, wherein at least one of the electronic device information is provided from a manufacturer.

18. An electronic device comprising:
a processor;
a voltage regulator to receive an input voltage and to provide an output voltage to the processor;
a battery controller to store electronic device information, to receive first battery information related to a current battery power at a first time, and to receive second battery information related to a current battery power at a second time; and
a controller to receive the electronic device information, the first battery information and the second battery information from the battery controller, and the controller to provide, first power information to the processor based on the received first battery information, the first power information to include a first maximum calculated current of the processor, and the processor to receive the first power information including the first maximum calculated current and to operate based on the first power information including the first maximum calculated current received from the controller,
the controller to subsequently provide second power information to the processor based on the received second battery information, the second power information to include a second maximum calculated current of the processor, and the processor to receive the second power information including the second maximum calculated current and
to operate based on the second power information including the second maximum calculated current received from the controller.

19. The electronic device of claim 18, further comprising at least one battery to provide the input voltage to the voltage regulator, and the battery controller to receive the battery information related to the current battery power based at least in part on the at least one battery.

20. The electronic device of claim 19, wherein the battery controller to receive battery power information regarding the at least one battery.

21. The electronic device of claim 18, wherein the power information provided from the controller includes a maximum calculated frequency for the processor.

22. The electronic device of claim 18, wherein the power information provided from the controller includes a maximum calculated power level for the processor.

23. The electronic device of claim 18, wherein the electronic device information relates to at least one of a voltage of the voltage regulator, a parasitic resistance and a current for the processor.

24. The electronic device of claim 18, wherein at least one of the electronic device information is provided from a manufacturer.

* * * * *